Patented Feb. 26, 1946

2,395,455

UNITED STATES PATENT OFFICE 2,395,455

DIHYDRONORPOLYCYCLOPENTADIENYL ISOTHIOCYANATES

Herman A. Bruson, Philadelphia, Pa., assignor to The Resinous Products & Chemical Company, Philadelphia, Pa., a corporation of Delaware No Drawing. Application January 13, 1945, Serial No. 572,739

9 Claims. (Cl. 260—454)

This invention relates to addition-rearrangement products of nascent thiocyanic acid (HSCN) and polycyclopentadienes having two double bonds and one to four endomethylene cycles per molecule. It further relates to a method for the preparation of these new products.

In accordance with the disclosure of the present application, which is a continuation-in-part of application Serial No. 476,646, filed February 20, 1943, thiocyanic acid is reacted in the presence of water with polycyclopentadienes having the formula:

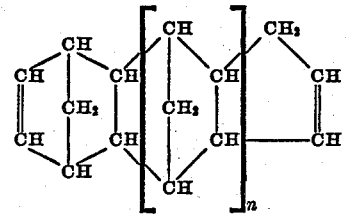

wherein $n$ is zero or a small integer, such as 1, 2, or 3. The polycyclopentadiene adds thiocyanic acid, and, at the same time, a rearrangement takes place to form a new type of ring system containing one double bond in a terminal five-membered cycle. This new ring system is here designated as the norpolycyclopentadiene system. The new addition-rearrangement products are primarily unsaturated isothiocyanates with the possible presence of small amounts of thiocyanates. The character of the group added, contrary to what was expected, is an —N=C=S group as demonstrated by the reaction of the new addition-rearrangement products with ammonia and amines which form thioureas therewith. The isothiocyanates of this invention are capable of undergoing further reaction at the olefinic linkage of the terminal five-membered cycle to give new saturated cyclic compounds. The new isothiocyanodihydronorpolycyclopentadienes may add chlorine, bromine, iodine chloride, iodine bromide, thiocyanogen, hydrogen, etc., to this residual bond.

Typical of the polycyclopentadienes having two double bonds per molecule which may be used for the purposes of this invention are dicyclopentadiene, tricyclopentadiene, tetracyclopentadiene, pentacyclopentadiene, and homologues, isomers, and mixtures thereof. These hydrocarbons are crystalline solids obtainable by heating cyclopentadiene at 150°–200° C. in a closed vessel. They contain one to four cycles having an endomethylene group and possess two double bonds, only one of which, however, responds to the reaction with thiocyanic acid even when in excess. Individual, relatively pure, polycyclopentadienes may be used or mixtures of these hydrocarbons.

The reaction of polycyclopentadienes and nascent thiocyanic acid takes place particularly rapidly in the presence of water—at temperatures of about 60° C. to about 110° C., although somewhat lower and higher temperatures may be used. In the preferred temperature range little, if any, polymerization of thiocyanic acid occurs. This acid is generated in situ from a thiocyanate salt and a strong, non-oxidizing acid which is stronger than thiocyanic acid.

The reaction between polycyclopentadiene and thiocyanic acid is carried out by mixing a salt of thiocyanic acid, water, and polycyclopentadiene, heating the mixture to a reacting temperature, preferably 60° C. to 110° C., and, while the mixture is stirred rapidly, gradually adding an acid, preferably a mineral acid such as sulfuric or hydrochloric. The strong acid momentarily liberates thiocyanic acid which reacts at once with the polycyclopentadiene. At the same time, a rearrangement takes place to yield isothiocyanodihydronorpolycyclopentadiene.

These new compounds may be represented by the general formula:

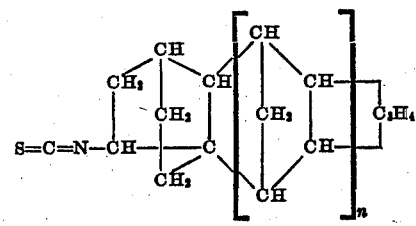

wherein $n$ is a number from zero to three, inclusive, and $C_3H_4$ is a propenylene group which in conjunction with the adjoining carbon atoms forms a cyclopenteno group.

While any salt of thiocyanic acid can be used, it is advantageous to use water-soluble salts, such as ammonium thiocyanate, sodium thiocyanate, potassium thiocyanate, calcium thiocyanate, and the like. It is desirable to liberate thiocyanic acid from these salts by the use of approximately equivalent proportions of strong mineral acid.

The following examples illustrate this invention, the parts being by weight.

Example 1

A mixture of 132 parts of dicyclopentadiene, 75 parts of water, and 76 parts of ammonium thiocyanate is rapidly stirred and heated under a reflux condenser at 90°–95° C. To the hot, stirred solution, 100 parts of concentrated hydrochloric acid (37%) is added dropwise during the course of one hour while the reaction temperature is maintained at 90°–95° C. The mixture is then heated for three hours longer at 90°–95° C., filtered hot by suction, and allowed to separate into layers. The oil layer of the clear filtrate is separated, then washed with water, and distilled in vacuo. The thiocyanic acid addition-rearrangement product of dicyclopentadiene distils over between 127° and 132° C. at 2 mm. absolute pressure of mercury as a pale yellow oil having a characteristic faint thiocyanate-like odor. The yield is 120 parts. Upon redistillation it boils at 140°–142° C./6 mm. and possesses the probable formula:

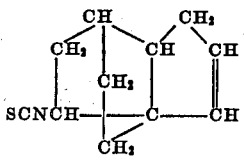

It is readily soluble in kerosene and such solutions may be used for killing flies, mosquitoes, bedbugs, and other soft-bodied insects.

The product of Example 1 when boiled with ammonium hydroxide solution yields the crystalline thiourea:

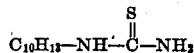

which has a melting point of 197° C. It also gives, upon being boiled with acetic acid, the corresponding amide, $C_{10}H_{13}NHCOCH_3$, having a melting point of 129°–130° C.

The product of this example is soluble in lubricating oil and may be added thereto to give better lubrication under extreme pressures.

Example 2

To a mixture of 132 parts of dicyclopentadiene, 100 parts of water, and 81 parts of sodium thiocyanate heated to 99° C. and rapidly stirred under reflux, there is gradually added 135 parts of 37% sulfuric acid during the course of thirty-five minutes. The mixture is then heated and stirred for one-half hour longer at 99° C. and filtered hot by suction. The oil layer of the filtrate is separated, washed with water, and distilled in vacuo. The distillate is dihydronordicyclopentadiene isothiocyanate, identical with that obtained in Example 1, in a yield of 100 parts.

Example 3

Fifty parts of concentrated hydrochloric acid (37% strength) is added dropwise during the course of twenty-five minutes to a well-stirred mixture of 99 parts of tricyclopentadiene, 40 parts of water, and 38 parts of ammonium thiocyanate, which is maintained at 95°–99° C. under a reflux condenser. The mixture is then stirred for one-half hour longer at 95°–99° C., and is filtered hot by suction. The oil layer of the filtrate is separated, washed and distilled in vacuo.

The addition-rearrangement of HSCN and tricyclopentadiene distils over between 188° and 190° C. at 2 mm. as a yellow oil, which gradually solidifies to a waxy mass. The yield is 70 parts. The product consists primarily of the isothiocyanate having the probable formula:

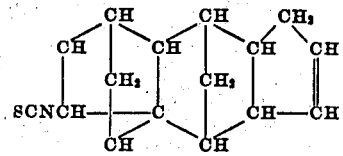

When this product is crystallized from ethanol, white, fluffy, needle crystals, melting at 66°–67° C., are obtained. These dissolve in kerosene and other organic solvents to yield a powerful insecticidal spray against flies, mosquitoes, roaches, etc. The sprays made from this isothiocyanate and also other isothiocyanates of this invention are exceptionally free from possibly objectionable odor and from irritation.

Example 4

One hundred thirty-two parts of dicyclopentadiene is mixed with 264 parts of tetracyclopentadiene, 225 parts of water, and 152 parts of ammonium thiocyanate. The mixture is stirred and heated under reflux to 95°–100° C., and 200 parts of concentrated 37% hydrochloric acid added dropwise thereto during the course of two hours. The mixture is stirred and heated for an additional two hours at 95°–100° C., then mixed with an equal volume of toluene, and filtered hot by suction. The oil layer of the filtrate is separated, washed, and distilled under reduced pressure at 1 mm. until the vapor temperature reaches 200° C./2 mm. Dihydronordicyclopentadienyl isothiocyanate is obtained in a yield of 128 parts, boiling at 127°–130° C./1 mm. Dihydronortetracyclopentadienyl isothiocyanate, weighing 250 parts, cannot be distilled at this pressure without decomposition. It is obtained as a dark red oil.

In the same manner, dihydronorpentacyclopentadienyl isothiocyanate can be obtained as a dark red oil by reacting pentacyclopentadiene with nascent thiocyanic acid.

Although in the above examples practically pure polycyclopentadienes have been used, the process shown may also be applied to mixtures of hydrocarbons which contain 5% or more of the polycyclopentadienes having two double bonds per molecule, such as are obtained in the thermal cracking of petroleum or in the manufacture of water gas. The reaction of the polycyclopentadienes provides a new means for separating the components of mixtures of unsaturated hydrocarbons and gives new utility to such products.

I claim:

1. The addition-rearrangement product of one mol of nascent thiocyanic acid and one mol of a crystalline polycyclopentadiene having two double bonds and one to four endomethylene cycles per molecule, said acid being formed in the presence of said polycyclopentadiene in an aqueous bath at 60° C. to 100° C. and said product being a dihydronorpolycyclopentadienyl isothiocyanate.

2. The addition-rearrangement product of one mol of nascent thiocyanic acid and one mol of dicyclopentadiene having two double bonds and one endomethylene cycle per molecule, said acid being formed in the presence of the dicyclopentadiene in an aqueous bath at 60° C. to 100° C. and said product being dihydronordicyclopentadienyl isothiocyanate.

3. The addition-rearrangement product of one mol of nascent thiocyanic acid and one mol of tricyclopentadiene having two double bonds and two endomethylene cycles per molecule, said acid being formed in the presence of the tricyclopentadiene in an aqueous bath at 60° C to 100° C. and said product being dihydronortricyclopentadienyl isothiocyanate.

4. The addition-rearrangement product of one mol of nascent thiocyanic acid and one mol of tetracyclopentadiene having two double bonds and three endomethylene cycles per molecule, said acid being formed in the presence of the tetracyclopentadiene in an aqueous bath at 60° C. to 100° C. and said product being dihydronortetracyclopentadienyl isothiocyanate.

5. A method for preparing dihydronorpolycyclopentadienyl isothiocyanates which comprises reacting a crystalline polycyclopentadiene having two double bonds and one to four endomethylene cycles per molecule with nascent thiocyanic acid in the presence of water at about 60° C. to about 100° C.

6. A method for preparing dihydronorpolycyclopentadienyl isothiocyanates which comprises mixing a crystalline polycyclopentadiene having two double bonds and one to four endomethylene cycles per molecule and a thiocyanate salt in water, heating the resulting mixture to about 60° C. to about 100° C., and adding a mineral acid thereto.

7. A method for preparing dihydronordicyclopentadienyl isothiocyanate which comprises reacting dicyclopentadiene with nascent thiocyanic acid in the presence of water at about 60° C. to about 100° C.

8. A method for preparing dihydronortricyclopentadienyl isothiocyanate which comprises reacting tricyclopentadiene having two double bonds and two endomethylene cycles per molecule with nascent thiocyanic acid in the presence of water at about 60° C. to about 100° C.

9. A method for preparing dihydronortetracyclopentadienyl isothiocyanate which comprises reacting tetracyclopentadiene having two double bonds and three endomethylene cycles per molecule with nascent thiocyanic acid in the presence of water at about 60° C. to about 100° C.

HERMAN A. BRUSON.